(12) United States Patent
Peeper et al.

(10) Patent No.: US 9,679,390 B2
(45) Date of Patent: *Jun. 13, 2017

(54) SYSTEMS AND METHODS FOR REMOVING A BACKGROUND OF AN IMAGE

(71) Applicant: Microsoft Technology Licensing, LLC, Redmond, WA (US)

(72) Inventors: Craig Peeper, Kirkland, WA (US); Johnny Lee, Bellevue, WA (US); Tommer Leyvand, Seattle, WA (US); Szymon Stachniak, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

This patent is subject to a terminal disclaimer.

(21) Appl. No.: 14/143,879

(22) Filed: Dec. 30, 2013

(65) Prior Publication Data

US 2014/0112547 A1 Apr. 24, 2014

Related U.S. Application Data

(62) Division of application No. 12/575,363, filed on Oct. 7, 2009, now Pat. No. 8,867,820.

(51) Int. Cl.
*G06T 7/00* (2006.01)
*G06T 7/194* (2017.01)
(Continued)

(52) U.S. Cl.
CPC ................ *G06T 7/194* (2017.01); *G06T 7/11* (2017.01); *G06T 7/215* (2017.01); *G06T 7/254* (2017.01);
(Continued)

(58) Field of Classification Search
CPC .......... G06T 2207/10028; G06T 19/00; G06T 15/08; G06T 2207/20144; G06T 7/0081;
(Continued)

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 101208723 A 6/2008
CN 101254344 B 6/2010
(Continued)

OTHER PUBLICATIONS

Zhao, "Dressed Human Modeling, Detection, and Parts Localization", 2001, The Robotics Institute, Carnegie Mellon University, Pittsburgh, PA.
(Continued)

*Primary Examiner* — Manav Seth
(74) *Attorney, Agent, or Firm* — Baker & Hostetler LLP

(57) ABSTRACT

An image such as a depth image of a scene may be received, observed, or captured by a device. A grid of voxels may then be generated based on the depth image such that the depth image may be downsampled. A background included in the grid of voxels may then be discarded to isolate one or more voxels associated with a foreground object such as a human target and the isolated voxels associated with the foreground object may be processed.

14 Claims, 9 Drawing Sheets

(51) Int. Cl.
  *G06T 15/00* (2011.01)
  *G06T 19/00* (2011.01)
  *G06T 7/11* (2017.01)
  *G06T 7/215* (2017.01)
  *G06T 7/254* (2017.01)

(52) U.S. Cl.
  CPC .............. *G06T 15/00* (2013.01); *G06T 19/00* (2013.01); *G06T 2207/10028* (2013.01)

(58) Field of Classification Search
  CPC ........ G06T 7/2046; G06T 15/00; G06T 17/00; G06T 2200/04; G06T 7/2053; G06T 7/00; G06T 7/0024; G06T 7/0077; G06K 2209/40; H04N 13/0055; H04N 13/0456
  See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,561,745 A | 10/1996 | Jackson et al. |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,792,147 A | 8/1998 | Evans et al. |
| 5,844,241 A | 12/1998 | Liu et al. |
| 5,875,108 A | 2/1999 | Hoffberg et al. |
| 5,877,803 A | 3/1999 | Wee et al. |
| 5,909,218 A | 6/1999 | Naka et al. |
| 5,913,727 A | 6/1999 | Ahdoot |
| 5,933,125 A | 8/1999 | Fernie |
| 5,974,175 A | 10/1999 | Suzuki |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,163,336 A | 12/2000 | Richards |
| 6,173,066 B1 | 1/2001 | Peurach et al. |
| 6,181,343 B1 | 1/2001 | Lyons |
| 6,188,777 B1 | 2/2001 | Darrell et al. |
| 6,191,773 B1 | 2/2001 | Maruno et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,272,231 B1 | 8/2001 | Maurer et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,400,368 B1 | 6/2002 | Laperriere |
| 6,411,744 B1 | 6/2002 | Edwards |
| 6,430,997 B1 | 8/2002 | French et al. |
| 6,476,834 B1 | 11/2002 | Doval et al. |
| 6,487,304 B1 | 11/2002 | Szeliski |
| 6,496,598 B1 | 12/2002 | Harman |
| 6,503,195 B1 | 1/2003 | Keller et al. |
| 6,539,931 B2 | 4/2003 | Trajkovic et al. |
| 6,556,199 B1 | 4/2003 | Fang et al. |
| 6,570,555 B1 | 5/2003 | Prevost et al. |
| 6,573,912 B1 | 6/2003 | Suzuki et al. |
| 6,633,294 B1 | 10/2003 | Rosenthal et al. |
| 6,640,202 B1 | 10/2003 | Dietz et al. |
| 6,658,136 B1 | 12/2003 | Brumitt |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,700,586 B1 | 3/2004 | Demers |
| 6,704,433 B2 | 3/2004 | Matsuo et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,864,903 B2 | 3/2005 | Suzuki |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,980,690 B1 | 12/2005 | Taylor et al. |
| 7,003,134 B1 | 2/2006 | Covell et al. |
| 7,035,436 B2 | 4/2006 | Nakamura et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |

(56) References Cited

U.S. PATENT DOCUMENTS

| | | |
|---|---|---|
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,194,122 B2 | 3/2007 | Faber et al. |
| 7,202,898 B1 | 4/2007 | Braun et al. |
| 7,222,078 B2 | 5/2007 | Abelow |
| 7,227,526 B2 | 6/2007 | Hildreth et al. |
| 7,233,327 B2 | 6/2007 | Isner |
| 7,239,718 B2 | 7/2007 | Park et al. |
| 7,257,237 B1 | 8/2007 | Luck et al. |
| 7,259,747 B2 | 8/2007 | Bell |
| 7,274,800 B2 | 9/2007 | Nefian et al. |
| 7,308,112 B2 | 12/2007 | Fujimura et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,375,728 B2 | 5/2008 | Donath et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,598,976 B2 | 10/2009 | Sofer et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,783,118 B2 * | 8/2010 | Zhou .................... G06T 7/0081 348/154 |
| 7,806,589 B2 | 10/2010 | Tashman et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,961,910 B2 | 6/2011 | Lee et al. |
| 8,023,726 B2 | 9/2011 | Sundaresan et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,059,153 B1 | 11/2011 | Barreto et al. |
| 8,072,470 B2 | 12/2011 | Marks |
| 8,154,590 B2 | 4/2012 | Kressel et al. |
| 8,175,335 B2 | 5/2012 | Zhang et al. |
| 8,241,122 B2 | 8/2012 | Ohba et al. |
| 8,249,334 B2 * | 8/2012 | Berliner ............ G06K 9/00362 345/419 |
| 8,259,163 B2 | 9/2012 | Bell |
| 8,325,984 B2 | 12/2012 | Lee et al. |
| 8,483,436 B2 | 7/2013 | Lee et al. |
| 8,542,910 B2 | 9/2013 | Leyvand et al. |
| 8,564,534 B2 | 10/2013 | Leyvand et al. |
| 8,565,479 B2 | 10/2013 | Gurman et al. |
| 8,649,557 B2 | 2/2014 | Hyung et al. |
| 8,687,918 B2 * | 4/2014 | Tamura .................. G06T 5/50 345/632 |
| 2002/0158873 A1 | 10/2002 | Williamson |
| 2003/0052878 A1 | 3/2003 | Han et al. |
| 2003/0068075 A1 | 4/2003 | Faber et al. |
| 2003/0113018 A1 | 6/2003 | Nefian et al. |
| 2003/0156756 A1 | 8/2003 | Gokturk et al. |
| 2003/0169906 A1 | 9/2003 | Gokturk et al. |
| 2003/0208289 A1 | 11/2003 | Ben-Arie |
| 2003/0218606 A1 | 11/2003 | Zhirkov et al. |
| 2003/0231179 A1 | 12/2003 | Suzuki |
| 2003/0235341 A1 | 12/2003 | Gokturk et al. |
| 2004/0027329 A1 | 2/2004 | Nakamura |
| 2004/0104935 A1 | 6/2004 | Williamson et al. |
| 2004/0151366 A1 | 8/2004 | Nefian et al. |
| 2004/0155962 A1 | 8/2004 | Marks |
| 2004/0160444 A1 | 8/2004 | Salesin et al. |
| 2004/0183775 A1 | 9/2004 | Bell |
| 2005/0031166 A1 | 2/2005 | Fujimura et al. |
| 2005/0058337 A1 | 3/2005 | Fujimura et al. |
| 2005/0215319 A1 | 9/2005 | Rigopulos et al. |
| 2006/0170769 A1 | 8/2006 | Zhou |
| 2006/0177125 A1 | 8/2006 | Chan et al. |
| 2006/0187305 A1 | 8/2006 | Trivedi et al. |
| 2006/0252541 A1 | 11/2006 | Zalewski et al. |
| 2007/0103471 A1 | 5/2007 | Yang et al. |
| 2007/0110298 A1 | 5/2007 | Graepel et al. |
| 2007/0132777 A1 | 6/2007 | Miyagi et al. |
| 2007/0285419 A1 | 12/2007 | Givon |
| 2007/0298882 A1 | 12/2007 | Marks et al. |
| 2008/0002856 A1 | 1/2008 | Ma et al. |
| 2008/0026838 A1 | 1/2008 | Dunstan et al. |
| 2008/0037829 A1 | 2/2008 | Givon |
| 2008/0071507 A1 | 3/2008 | Hodgins et al. |
| 2008/0123968 A1 | 5/2008 | Nevatia et al. |
| 2008/0143718 A1 | 6/2008 | Ray et al. |
| 2008/0152191 A1 | 6/2008 | Fujimura et al. |
| 2008/0227073 A1 | 9/2008 | Bardsley et al. |
| 2008/0246759 A1 | 10/2008 | Summers |
| 2008/0252596 A1 | 10/2008 | Bell et al. |
| 2009/0010490 A1 | 1/2009 | Wang et al. |
| 2009/0041297 A1 | 2/2009 | Zhang et al. |
| 2009/0085864 A1 | 4/2009 | Kutliroff et al. |
| 2009/0096783 A1 | 4/2009 | Shpunt et al. |
| 2009/0097728 A1 | 4/2009 | Lee et al. |
| 2009/0122058 A1 | 5/2009 | Tschesnok |
| 2009/0141933 A1 | 6/2009 | Wagg |
| 2009/0154796 A1 | 6/2009 | Gupta et al. |
| 2009/0175540 A1 | 7/2009 | Dariush et al. |
| 2009/0183125 A1 | 7/2009 | Magal et al. |
| 2009/0215533 A1 | 8/2009 | Zalewski et al. |
| 2009/0221368 A1 | 9/2009 | Yen et al. |
| 2009/0221374 A1 | 9/2009 | Yen et al. |
| 2009/0232353 A1 | 9/2009 | Sundaresan et al. |
| 2009/0237499 A1 | 9/2009 | Kressel et al. |
| 2009/0245577 A1 | 10/2009 | Liu et al. |
| 2009/0271038 A1 | 10/2009 | Song et al. |
| 2009/0296991 A1 | 12/2009 | Anzola |
| 2010/0007717 A1 | 1/2010 | Spektor et al. |
| 2010/0034457 A1 | 2/2010 | Berliner et al. |
| 2010/0054525 A1 | 3/2010 | Gong et al. |
| 2010/0060722 A1 | 3/2010 | Bell |
| 2010/0111370 A1 | 5/2010 | Black et al. |
| 2010/0195869 A1 | 8/2010 | Geiss |
| 2010/0235786 A1 | 9/2010 | Maizels et al. |
| 2010/0278391 A1 | 11/2010 | Hsu et al. |
| 2010/0303302 A1 | 12/2010 | Kipman et al. |
| 2011/0044524 A1 | 2/2011 | Wang et al. |
| 2011/0052006 A1 | 3/2011 | Gurman et al. |
| 2011/0080336 A1 | 4/2011 | Leyvand et al. |

(56) References Cited

U.S. PATENT DOCUMENTS

| | | |
|---|---|---|
| 2011/0080475 A1 | 4/2011 | Lee et al. |
| 2011/0081045 A1 | 4/2011 | Lee et al. |
| 2011/0234589 A1 | 9/2011 | Lee et al. |
| 2012/0057753 A1 | 3/2012 | Lee et al. |
| 2012/0128208 A1 | 5/2012 | Leyvand et al. |
| 2012/0281904 A1 | 11/2012 | Gong et al. |
| 2013/0070058 A1 | 3/2013 | Lee et al. |
| 2013/0243257 A1 | 9/2013 | Lee et al. |
| 2014/0022161 A1 | 1/2014 | Leyvand et al. |
| 2014/0044309 A1 | 2/2014 | Leyvand et al. |
| 2014/0112547 A1 | 4/2014 | Peeper et al. |

FOREIGN PATENT DOCUMENTS

| | | |
|---|---|---|
| EP | 0583061 A2 | 2/1994 |
| JP | 08-044490 A | 2/1996 |
| JP | 09-231369 A | 9/1997 |
| JP | 2007-061210 A | 3/2007 |
| JP | 2008-012103 A | 1/2008 |
| KR | 10-2001-0042673 | 5/2001 |
| KR | 10-2007-0061231 | 6/2007 |
| KR | 10-2009-0069704 | 7/2009 |
| WO | WO 93/10708 A1 | 6/1993 |
| WO | WO 97/17598 A1 | 5/1997 |
| WO | WO 99/44698 A1 | 9/1999 |
| WO | WO 2007/132451 A2 | 11/2007 |
| WO | WO 2008/004332 A1 | 1/2008 |
| WO | WO 2009/059065 A1 | 5/2009 |

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

PCT Application No. PCT/US2010/051599: International Search Report and Written Opinion of the International Searching Authority, Jun. 23, 2011, 10 pages.

U.S. Appl. No. 12/621,013: Non-final office action dated Oct. 6, 2010, 4 pages.

U.S. Appl. No. 12/621,013: Notice of Allowance dated Mar. 22, 2011, 8 pages.

U.S. Appl. No. 13/365,121: Non-final office action dated Apr. 9, 2012, 14 pages.

U.S. Appl. No. 13/365,121: Final office action dated Jul. 30, 2012, 16 pages.

U.S. Appl. No. 13/365,121: Notice of Allowance dated Jan. 18, 2013, 7 pages.

U.S. Appl. No. 12/575,388: Non-final office action Jun. 4, 2012, 9 pages.

U.S. Appl. No. 12/575,388: Notice of Allowance dated Jan. 9, 2013, 8 pages.

U.S. Appl. No. 13/156,457: Notice of Allowance dated Jul. 27, 2012, 9 pages.

U.S. Appl. No. 13/156,457: Non-final office action dated Dec. 30, 2011, 9 pages.

U.S. Appl. No. 13/289,823: Non-final office action dated Sep. 21, 2012, 9 pages.

U.S. Appl. No. 13/289,823: Notice of Allowance dated Mar. 6, 2013, 8 pages.

U.S. Appl. No. 12/616,471: Non-final office action dated Jul. 10, 2012, 9 pages.

U.S. Appl. No. 12/616,471: Notice of Allowance dated Feb. 5, 2013, 9 pages.

"Virtual High Anxiety", Tech Update, Aug. 1995, pp. 22.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Berendsen et al., "Volumetric Modeling of 3D Human Pose from Multiple Video", SAMT Workshop on Semantic 3D Media, Aug. 31, 2009, 8 pages.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Caillette et al., "Real-Time 3-D Human Body Tracking using Variable Length Markov Models", Advanced Interfaces Group, School of Computer Science, University of Manchester, in British Machine Vision Conference, Oxford, UK, Sep. 5-8, 2005, 10 pages.

Caillette et al., "Real-Time Markerless Human Body Tracking with Multi-View 3-D Voxel Reconstruction", in British Machine Vision Conference, London, England, Sep. 7-9, 2004, 597-606.

Caillette, "Real-Time Multi-View Human Body Tracking using 3D Voxel Reconstruction and High-Level Movement Prediction", A transfer report submitted to the university of Manchester in the faculty of Science and Engineering, Department of Computer Science, Aug. 2002, 1-51.

Chun et al., "3D Star Skeleton for Fast Human Posture Representation", World Academy of Science, Engineering and Technology, Apr. 4, 2008, 273-282.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Li et al., "A Real-Time 3D Human Body Tracking and Modeling System", IEEE International Conference on Image Processing, Oct. 8-11, 2006, 2809-2812.

Liu et al., "Contour-motion feature (CMF): A space-time approach for robust pedestrian detection", Pattern Recognition Letters, 30 (2009) 148-156, Available online Mar. 26, 2008.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

(56) References Cited

OTHER PUBLICATIONS

PCT Application No. PCT/US2010/055179: International Search Report and Written Opinion of the International Searching Authority, Jun. 28, 2011.
PCT Application No. PCT/US2010/051662: International Search Report and Written Opinion of the International Searching Authority, Jun. 15, 2011, 8 pages.
PCT application No. PCT/US2010/055171: International Search Report of the International Searching Authority, Jul. 22, 2011, 12 pages.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Qian et al., "A Gesture-Driven Multimodal Interactive Dance System", Jun. 2004, pp. 1579-1582, IEEE International Conference on Multimedia and Expo (ICME), Taipei, Taiwan.
Robertson et al., "Human Body Posture via Hierarchical Evolutionary Optimization", Joint Research Institute on Image and Signal Processing, School of Engineering and Physical Sciences, Heriot Watt University, in British Machine Vision Conference, Edinburgh, UK, Sep. 4-7, 2006, 1-10.
Rosenhahn et al., "Automatic Human Model Generation", 2005, pp. 41-48, University of Auckland (CITR), New Zealand.
Shao et al., "An Open System Architecture for a Multimedia and Multimodal User Interface", Aug. 24, 1998, Japanese Society for Rehabilitation of Persons with Disabilities (JSRPD), Japan.
Sheridan et al., "Virtual Reality Check", Technology Review, Oct. 1993, pp. 22-28, vol. 96, No. 7.
Sminchisescu et al., "Kinematic Jump Processes for Monocular 3D Human Tracking", Proceedings IEEE Conference on Computer Vision and Pattern Recognition, Madison, Jun. 18-20, 2003, 1-8.
Stenger, "Model-Based Hand Tracking Using a Hierarchical Bayesian Filter", Dissertation submitted to the University of Cambridge for the degree of Doctor of Philosophy, St. John's College, Mar. 2004, 165 pages.
Stevens, "Flights into Virtual Reality Treating Real World Disorders", The Washington Post, Mar. 27, 1995, Science Psychology, 2 pages.
Theobalt et al., "Combining 2D Feature Tracking and volume Reconstruction for Online Video-Based Human Motion Capture", Proceeding of Pacific Graphics, Beijing, China, Oct. 9-11, 2002, 1-8.
Urtasun et al., "3D Human Body Tracking using Deterministic Temporal Motion Models", Computer Vision Laboratory, EPFL, Aug. 12, 2009, 1-14.
Wren et el "Pfinder: Reel-Time Tracking of the Human Body" MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Wu et al., "Human Pose Estimation in Vision Networks via Distributed Local Processing and Nonparametric Belief Propagation", Advanced Concepts for Intelligent Vision Systems (ACIVS), France, Oct. 20-24, 2008, 13 pages.
Xu et al., "Human Detection Using Depth and Gray Images", Proceedings of the IEEE Conference on Advanced Video and Signal Based Surveillance (AVSS'03), Jul. 21-22, 2003, 7 pages.
Yamane et al., "Human Motion Database with a Binary Tree and Node Transition Graphs", Proceedings of Robotics: Science and Systems, Jun. 2009, 8 pages.
Zhao, "Dressed Human Modeling, Detection, and Parts Localization", The Robotics Institute Carnegie Mellon University, Jul. 26, 2001, 120 pages.
U.S. Appl. No. 12/575,388: Notice of Allowance dated Jun. 17, 2013, 6 pages.
U.S. Appl. No. 12/616,471: Notice of Allowance dated Jun. 25, 2013, 7 pages.
U.S. Appl. No. 13/678,288: Non-final office action dated Jul. 8, 2013, 8 pages.
U.S. Appl. No. 13/678,288: Notice of Allowance dated Oct. 29, 2013, 10 pages.
Chinese Patent Application No. 201080050924.2: English language translation of the First Office Action and Search Report dated Dec. 5, 2013, 5 pages.
U.S. Appl. No. 13/365,121: Notice of Allowance dated May 13, 2013, 8 pages.
U.S. Appl. No. 12/616,471: Notice of Allowance dated Jan. 4, 2014, 5 pages.
U.S. Appl. No. 14/059,258: Non-final office action dated Jan. 7, 2014, 6 pages.
U.S. Appl. No. 14/034,484, Non-final office action dated Nov. 27, 2013, 6 pages.
Carranza, et al., "Free-Viewpoint Video of Human Actors", In Proceeding of Special Interest Group on Computer Graphics and Interactive Techniques, vol. 22, Issue 3, Jul. 27, 2003, pp. 569-577.
Aggarwal, et al., "Human Motion Analysis: A Review", In Journal Computer Vision and Image Understanding, vol. 73, Issue 3, Mar. 1, 1999, pp. 428-440.
Wang et al., "Recent developments in human motion analysis", In Journal Pattern Recognition, vol. 36, Issue 3, Mar. 2003, pp. 585-601.
Azarbayejani, et al., "Real-Time 3-D Tracking of the human body", In Proceedings of IMAGE'COM 96, May 1996, pp. 1-6.
Woo, et al., "Sketch on Dynamic Gesture Tracking and Analysis Exploiting Vision-based 3D Interface", Visual Communications and Image Processing, Dec. 29, 2009, p. 11.
U.S. Appl. No. 13/889,901: Non-final office action dated Mar. 27, 2014, 5 pages.
U.S. Appl. No. 13/678,288: Non-final office action dated Apr. 3, 2014, 5 pages.
U.S. Appl. No. 14/034,484: Notice of Allowance dated Apr. 30, 2014, 9 pages.

\* cited by examiner

FIG. 7A

SYSTEMS AND METHODS FOR REMOVING A BACKGROUND OF AN IMAGE

CROSS-REFERENCE TO RELATED APPLICATIONS

This application is a divisional application of U.S. patent application Ser. No. 12/575,363 filed Oct. 7, 2009. U.S. patent application Ser. No. 12/575,363 is incorporated by reference herein in its entirety.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for tracking a user in a scene. For example, an image such as depth image of a scene may be received or observed. A grid of voxels may then be generated based on the depth image such that the depth image may be downsampled. For example, the depth image may include a plurality of pixels that may be divided into portions or blocks. A voxel may then be generated for each portion or block such that the received depth image may be downsampled into the grid of voxels.

A background of the grid of voxels may be determined and discarded or removed such that one or more voxels associated with a foreground object such as a human target may be isolated. According to one embodiment, the target recognition, analysis, and tracking system may determine the background. To determine the background, the target recognition, analysis, and tracking system may determine objects in the grid of voxels that may be moving and non-moving. The target recognition, analysis, and tracking system may discard the objects that may be non-moving as background.

The target recognition, analysis, and tracking system may then process the voxels associated with the human target that may be discarded. For example, the target recognition, analysis, and tracking system may determine one or more extremities for the isolated human target, may determine dimensions of such extremities, may generate a model for the isolated human target, or the like.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A-7B illustrates an example embodiment of a portion of the depth image being downsampled.

DETAILED DESCRIPTION OF ILLUSTRATIVE EMBODIMENTS

Figure 1A:
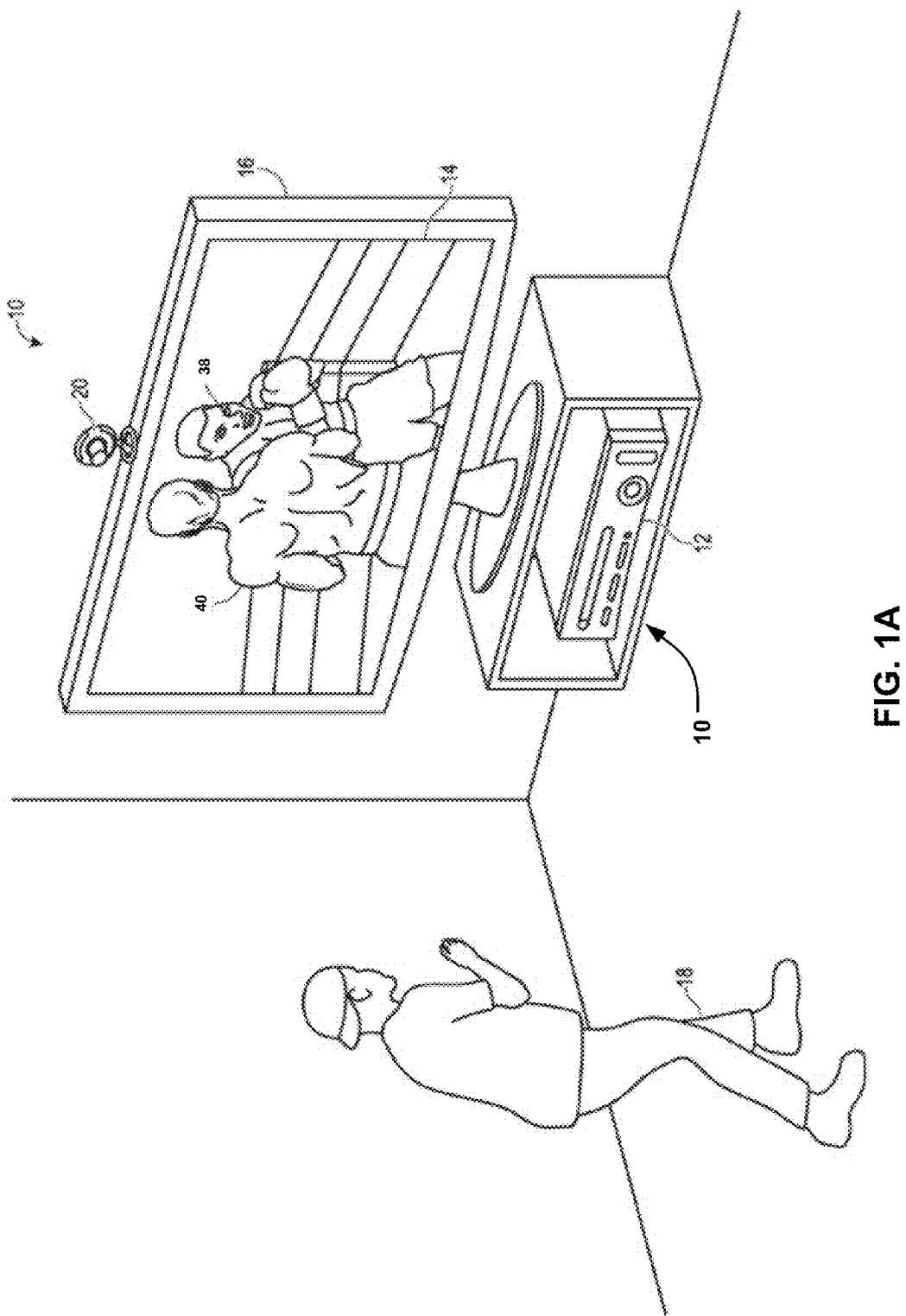
FIGS. 1A and 1B illustrate an example embodiment of a target recognition, analysis, and tracking system with a user playing a game.
Figure 1B:
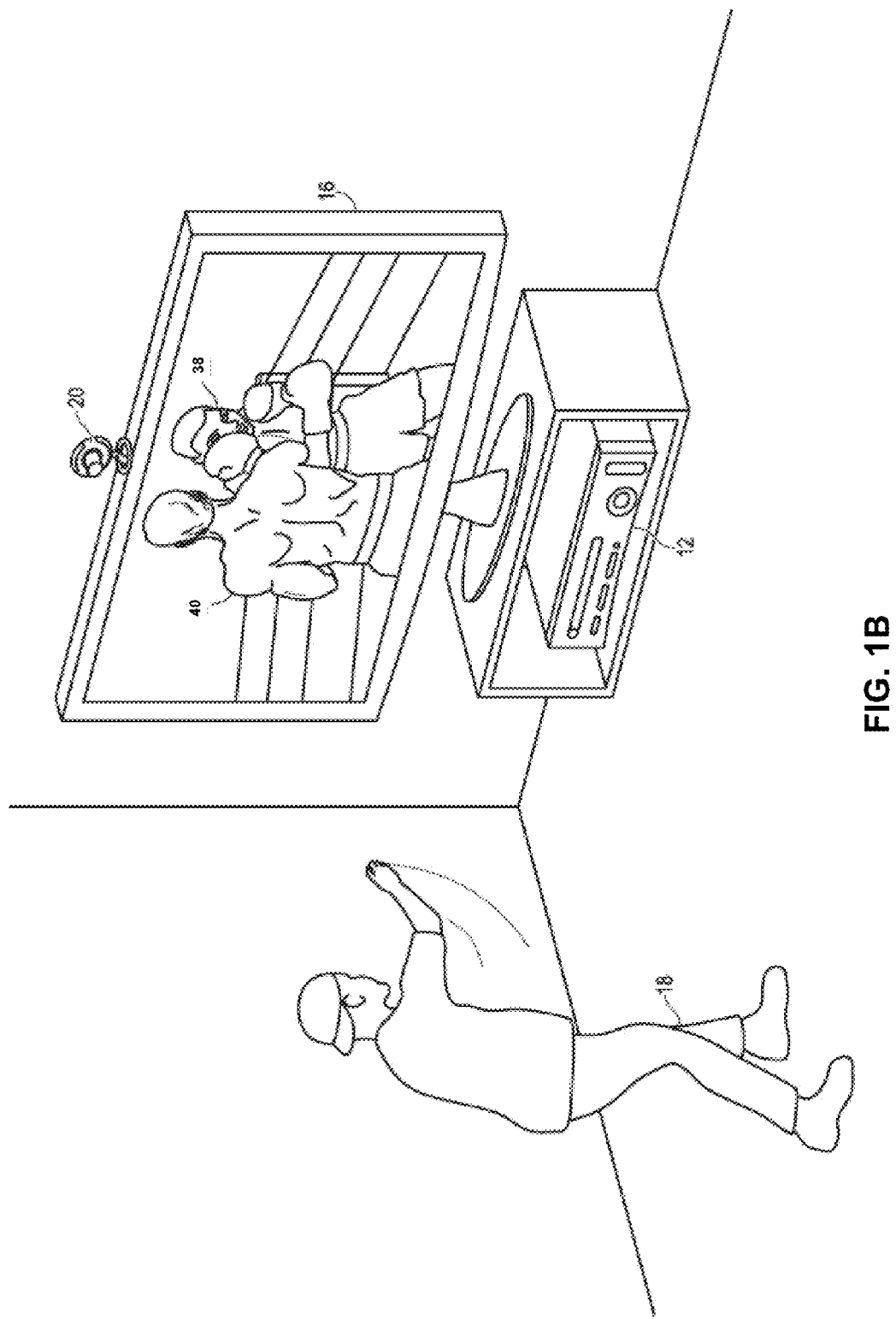

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image; generating a grid of voxels based on the depth image; determining whether one or more voxels in the grid are associated with a background; discarding the one or more voxels associated with the background to isolate voxels associated with a foreground object in the depth image; processing the grid with the isolated foreground object, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
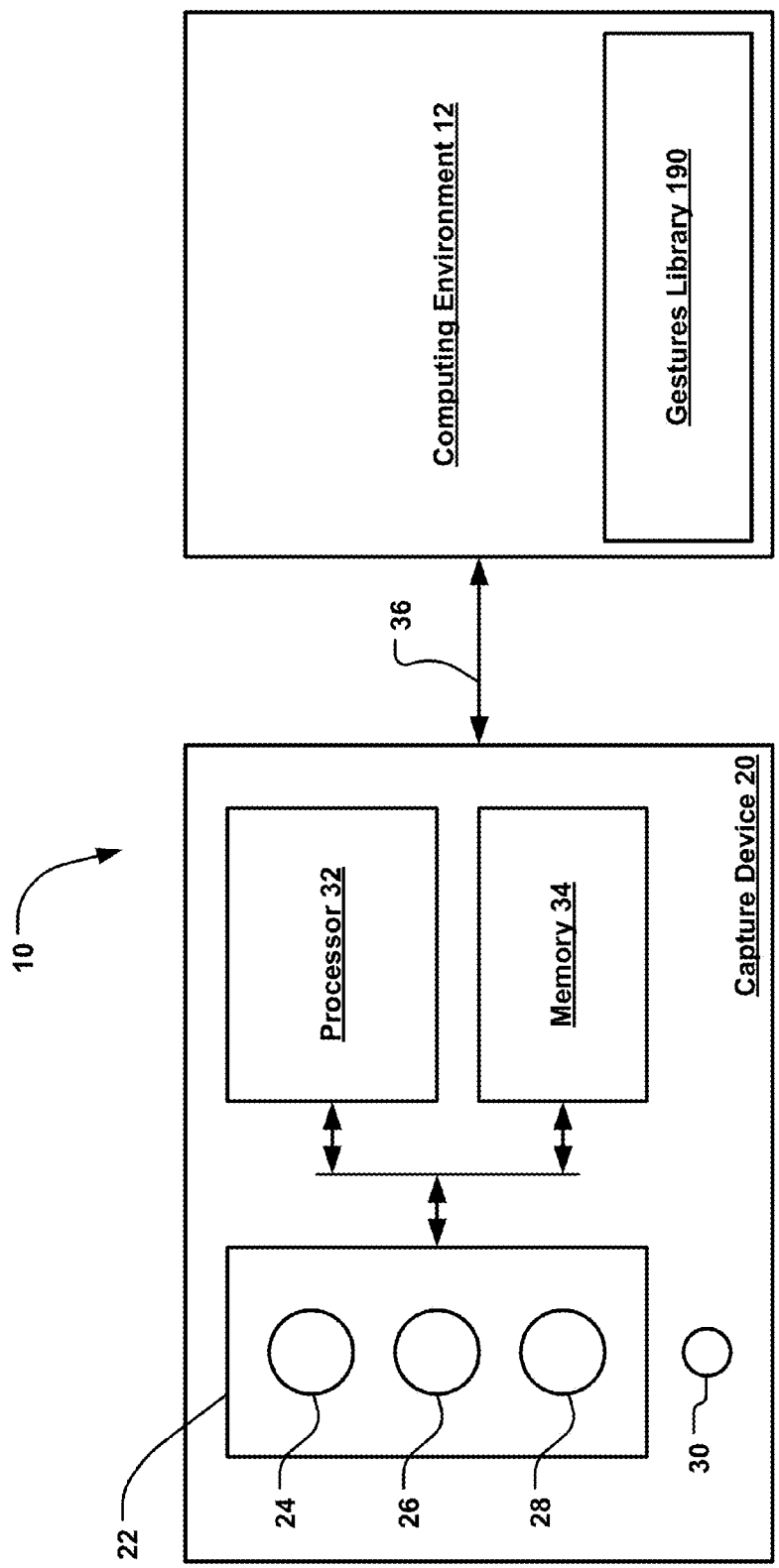
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image; generating a grid of voxels based on the depth image; determining whether one or more voxels in the grid are associated with a background; discarding the one or more voxels associated with the background to isolate voxels associated with a foreground object in the depth image; processing the grid with the isolated foreground object, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate an avatar or on-screen character. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
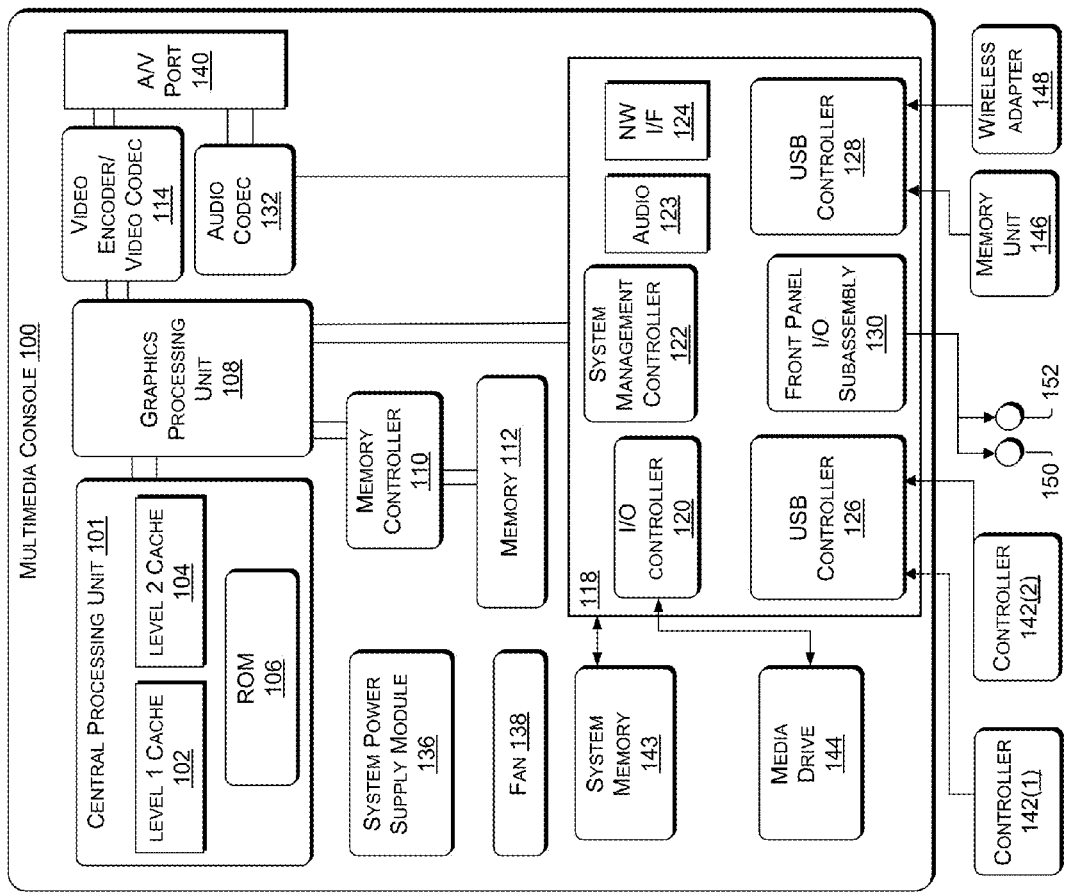
FIG. 3 illustrates an example embodiment of a computing environment that may be used to interpret one or more gestures in a target recognition, analysis, and tracking system and/or animate an avatar or on-screen character displayed by a target recognition, analysis, and tracking system.

FIG. 3 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
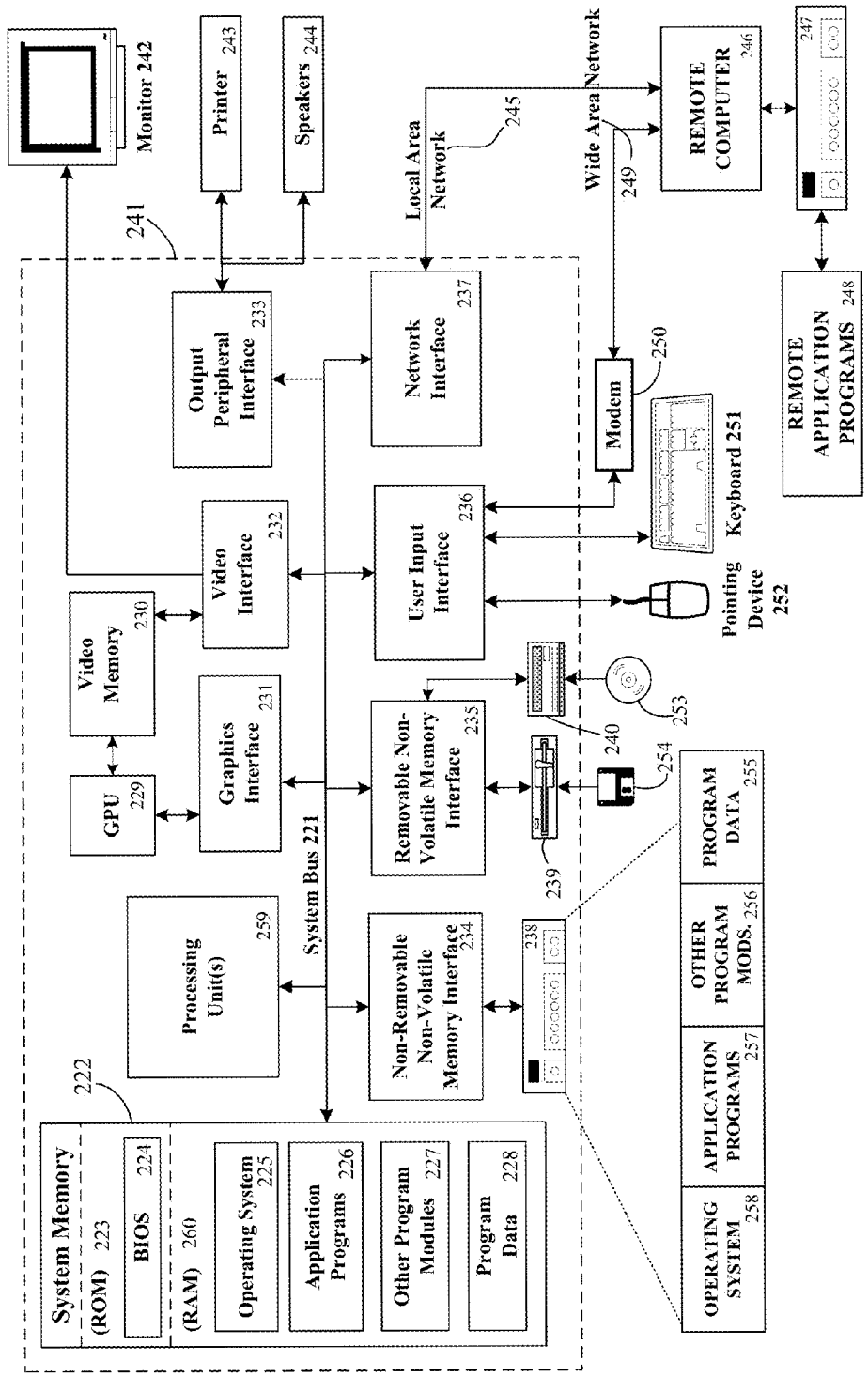
FIG. 4 illustrates another example embodiment of a computing environment that may be used to interpret one or more gestures in a target recognition, analysis, and tracking system and/or animate an avatar or on-screen character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate an avatar or on-screen character displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
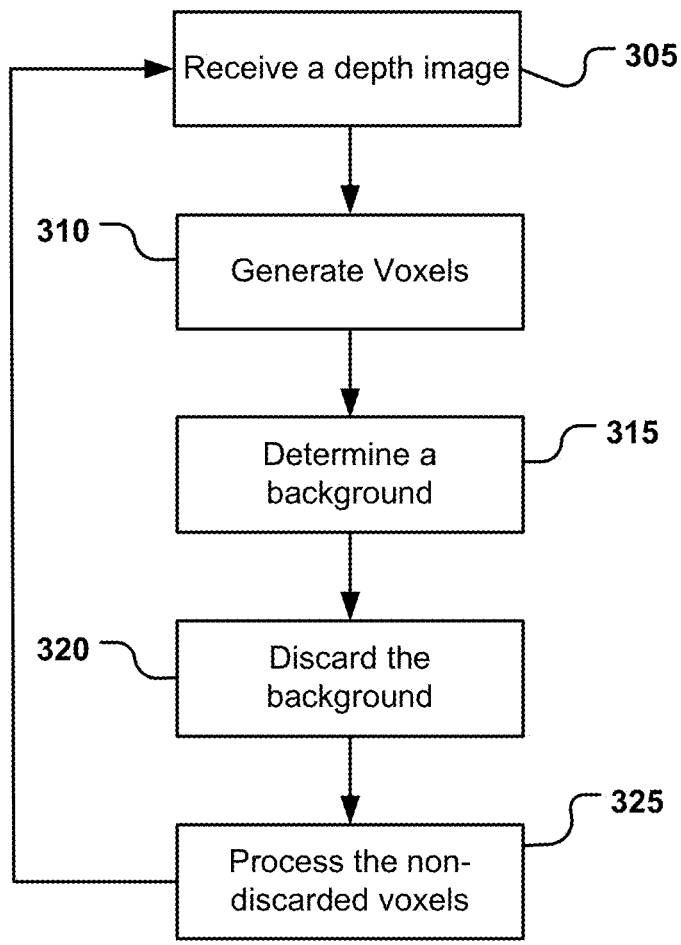
FIG. 5 depicts a flow diagram of an example method for processing depth information of a scene.

FIG. 5 depicts a flow diagram of an example method 300 for processing depth information a scene. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, a depth image may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as an a depth image of the scene using any suitable technique such as time-of-flight analysis, structured light analysis, stereo vision analysis, or the like.

The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6:
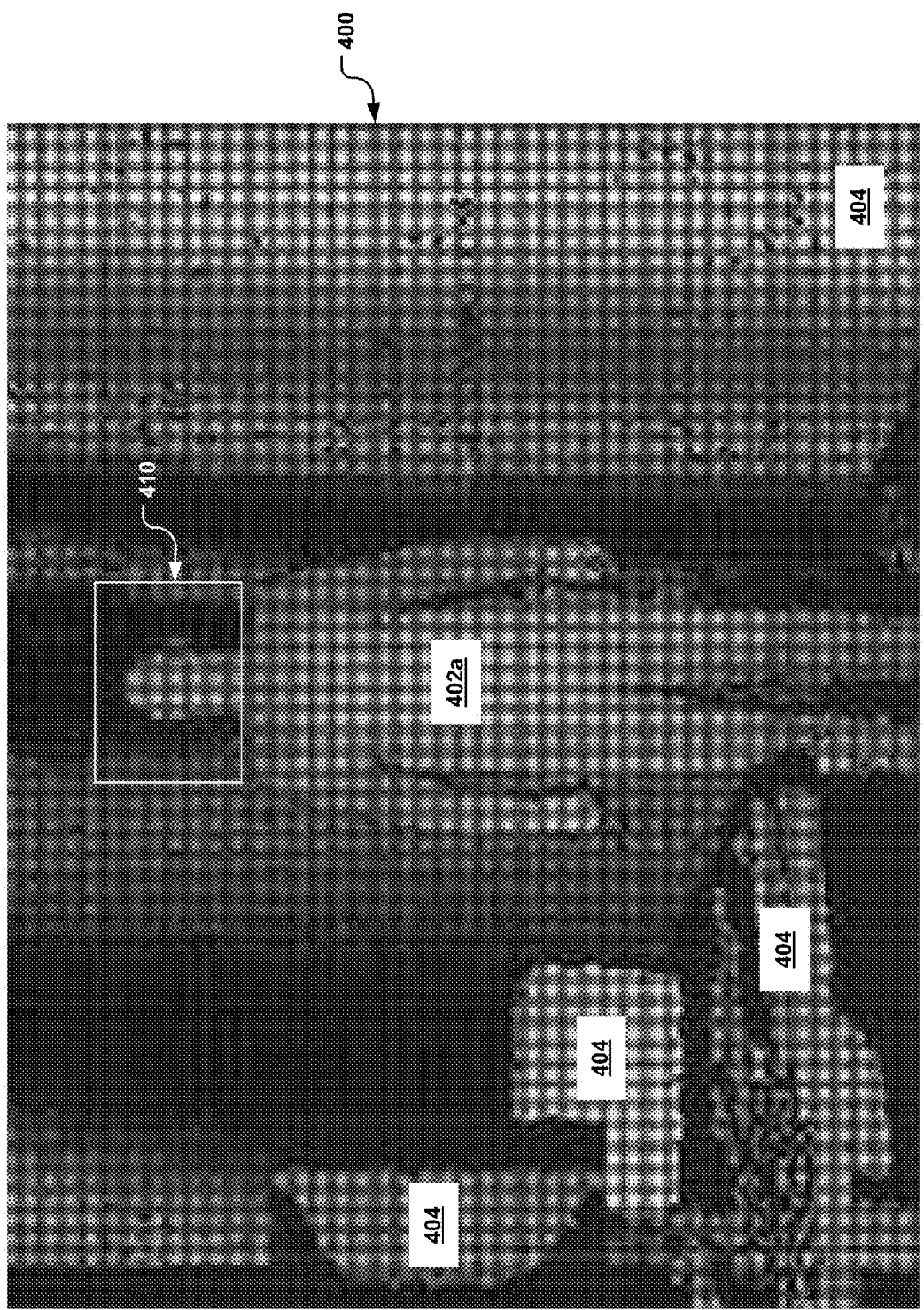
FIG. 6 illustrates an example embodiment of a depth image that may be captured or observed.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402a corresponding to, for example, a user such as the user 18 described above with respect to FIGS. 1A and 1B and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel at particular X-value and Y-value in the 2-D pixel area may have a depth value such as a length or distance in, for example, centimeters, millimeters, or the like of a target or object in the captured scene from the capture device.

In one embodiment, the depth image 400 may be colorized such that different colors of the pixels of the depth image correspond to and/or visually depict different distances of the human target 402a and non-human targets 404 from the capture device. For example, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the image, at 305, one or more high-variance and/or noisy depth values may be removed and/or smoothed from the depth image; portions of missing and/or removed depth information may be filled in and/or reconstructed; and/or any other suitable processing may be performed on the received depth image may such that the depth information associated with the depth image may used to generate a model such as a skeletal model, which will be described in more detail below.

According to an example embodiment, at 310, a grid of one or more voxels may be generated based on the received depth image. For example, the target recognition, analysis, and tracking system may downsample the received depth image by generating one or more voxels using information included in the received depth image such that a downsampled depth image may be generated. In one embodiment, the one or more voxels may be volume elements that may represent data or values of the information included in the received depth image on a sub-sampled grid.

For example, as described above, the depth image may include a 2-D pixel area of the captured scene where each pixel may have an X-value, a Y-value, and a depth value (or Z-value) associated therewith. In one embodiment, the depth image may be downsampled by reducing the pixels in the 2-D pixel area into a grid of one or more voxels. For example, the depth image may be divided into portions or blocks of pixels such as 4×4 blocks of pixels, 5×5 blocks of pixels, 8×8 block of pixels, a 10×10 block of pixels, or the like. Each portion or block may be processed to generate a voxel for the depth image that may represent a position of the portion or block associated the pixels of the 2-D depth image in real-world space. According to an example embodiment, the position of each voxel may be generated based on, for example, an average depth value of the valid or non-zero depth values for the pixels in the block or portion that the voxel may represent, a minimum and/or maximum depth value of the pixels in the portion or block that the voxel may represent, an average of the X-values and Y-values for pixels having a valid depth value in the portion or the block that the voxel may represent, or any other suitable information provided by the depth image. Thus, according to an example embodiment, each voxel may represent a sub-volume portion or block of the depth image having values such as an average depth value of the valid or non-zero depth values for the pixels in the block or portion that the voxel may represent, a minimum and/or maximum depth value of the pixels in the portion or block that the voxel may represent, an average of the X-values and Y-values for pixels having a valid depth value in the portion or the block that the voxel may represent, or any other suitable information provided by the depth image based on the X-values, Y-values, and depth values of the corresponding portion or block of pixels of the depth image received at 305.

In one embodiment, the grid of the one or more voxels in the downsampled depth image may be layered. For example, the target recognition, analysis, and tracking system may generate voxels as described above. The target recognition, analysis, and tracking system may then stack a generated voxel over one or more other generated voxels in the grid.

According to an example embodiment, the target recognition, analysis, and tracking system may stack voxels in the grid around, for example, edges of objects in the scene that may be captured in the depth image. For example, a depth image received at 305 may include a human target and a non-human target such as a wall. The human target may overlap the non-human target such as the wall at, for example, an an edge of the human target. In one embodiment, the overlapping edge may include information such as depth values, X-values, Y-values, or the like associated with the human target and the non-human target that may be captured in the depth image. The target recognition, analysis, and tracking system may generate a voxel associated with the human target and a voxel associated with the non-human target at the overlapping edge such that the voxels may be stacked and the information such as depth values, X-values, Y-values, or the like of the overlapping edge may be retained in the grid.

According to another embodiment, the grid of one or more voxels may be generated at 310 by projecting, for example, information such as the depth values, X-values, Y-values, or the like for the pixels in the depth image that may be received at 305 into a three-dimensional (3-D) space. For example, the target recognition, analysis, and tracking system may map information such as the depth values, X-values, Y-values, or the like for the pixels in the depth image to 3-D points in the 3-D space using a transformation such as a camera, image, or perspective transform such that the information may be transformed as trapezoidal or pyramidal shapes in the 3-D space. In one embodiment, the 3-D space having the trapezoidal or pyramidal shapes may divided into blocks such as cubes that may create a grid of voxels such that each of the blocks or cubes may represent a voxel in the grid. For example, the target recognition, analysis, and tracking system may superimpose a 3-D grid over the 3-D points that correspond to the object in the depth image. The target recognition, analysis, and tracking system may then divide or chop up the grid into the blocks representing voxels to downsample the depth image into a lower resolution. According to an example embodiment, each of the voxels in the grid may include an average depth value of the valid or non-zero depth values for the pixels associated with the 3-D space in the grid that the voxel may represent, a minimum and/or maximum depth value of the pixels associated with the 3-D space in the grid that the voxel may represent, an average of the X-values and Y-values for pixels having a valid depth value associated with the 3-D space in the grid that the voxel may represent, or any other suitable information provided by the depth image.

Figure 7A:
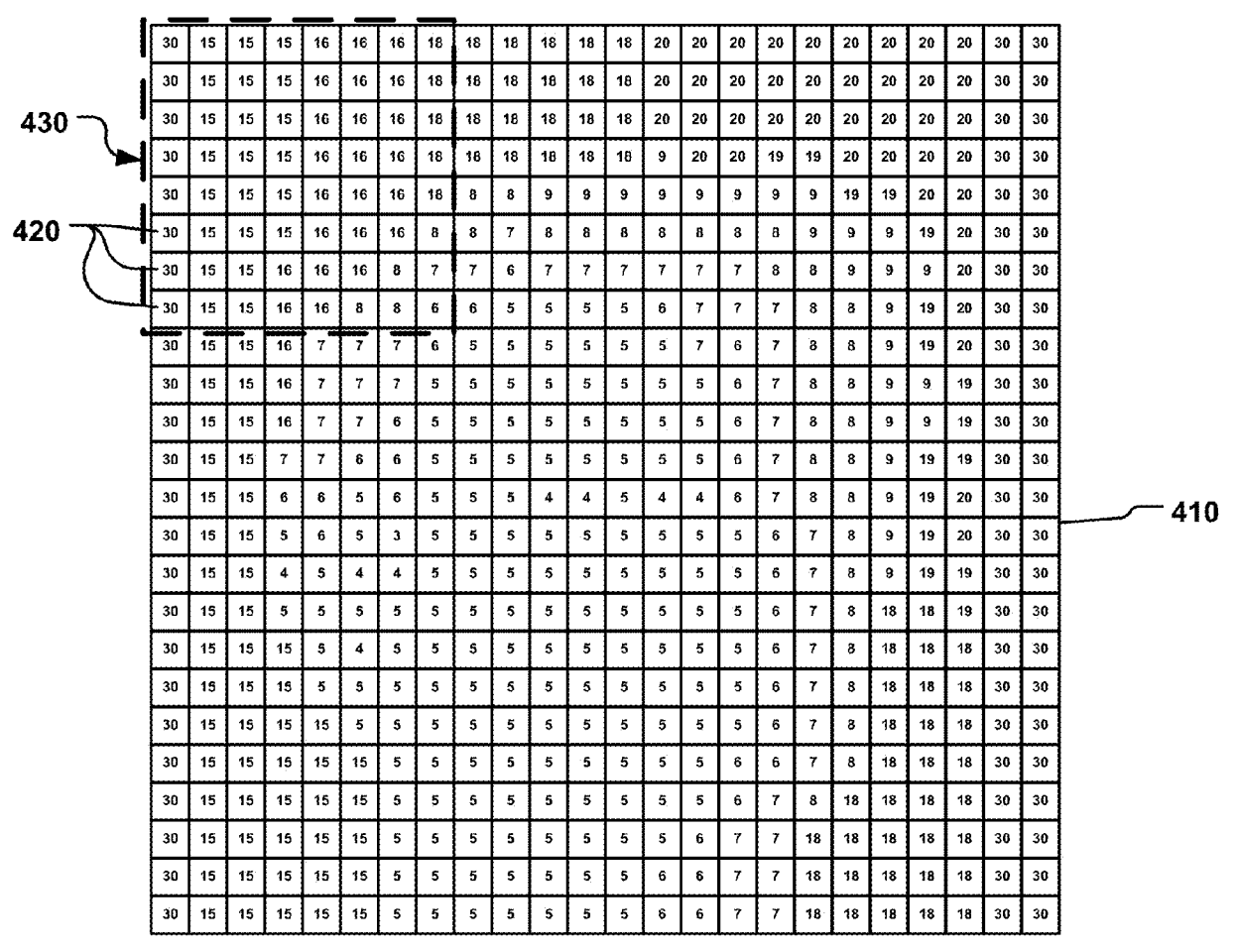
Figure 7B:
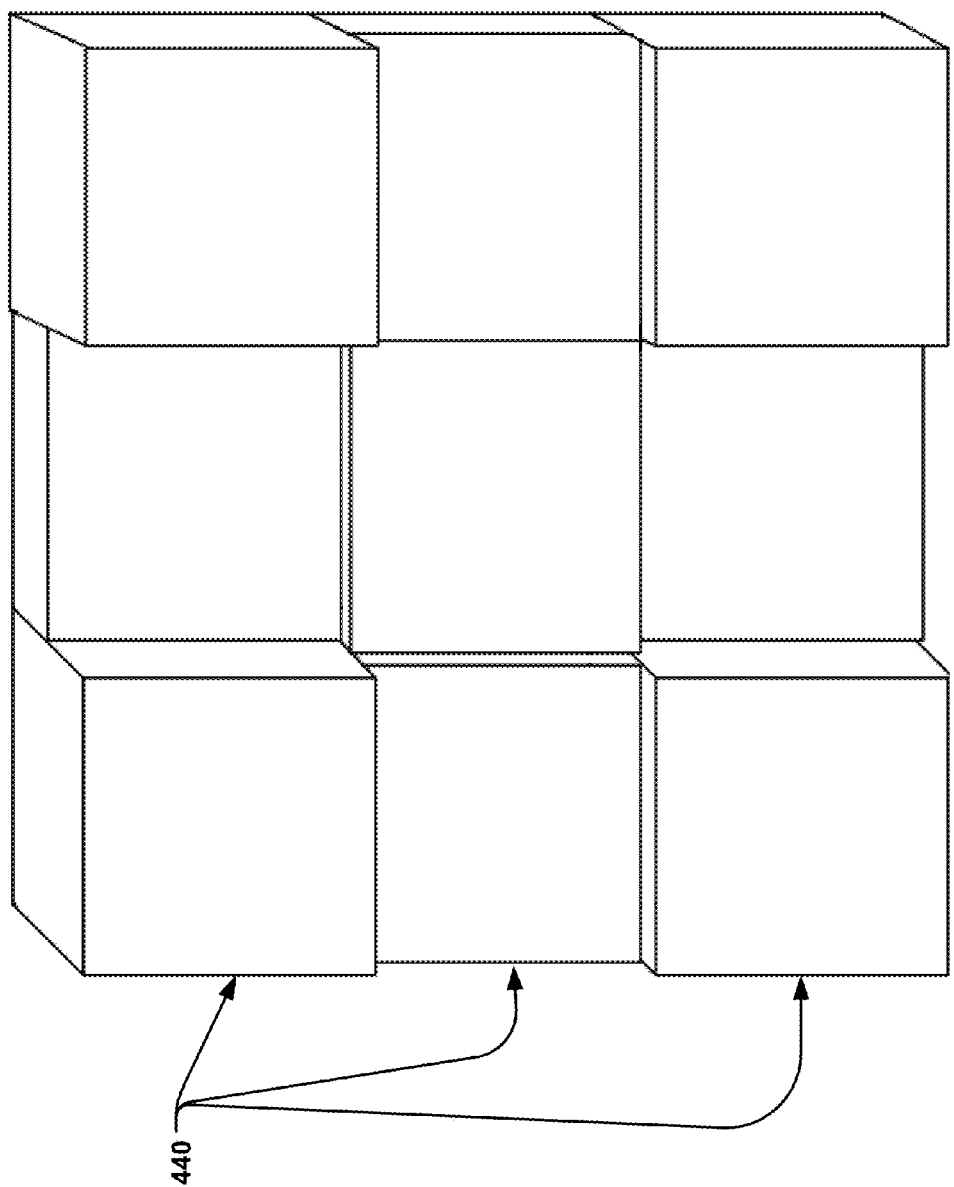

FIGS. 7A-7B illustrates an example embodiment of a portion of the depth image being downsampled. For example, as shown in FIG. 7A, a portion 410 of the depth image 400 described above with respect to FIG. 6 may include a plurality of pixels 420 where each pixel 420 may have an X-value, a Y-value, and a depth value (or Z-value) associated therewith. According to one embodiment, as described above, a depth image such as the depth image 400 may be downsampled by reducing the pixels in the 2-D pixel area into a grid of one or more voxels. For example, as shown in FIG. 7A, the portion 410 of the depth image 400 may be divided into a portion or a block 430 of the pixels 420 such as 8×8 block of the pixels 420. The target recognition, analysis, and tracking system may process the portion or block 430 to generate a voxel 440 that may represent a position of the portion or block 430 associated the pixels 420 in real-world space as shown in FIGS. 7A-7B.

Referring back to FIG. 5, at 315, a background of the grid of voxels included in the downsampled depth image may be determined. For example, a background such as the non-human targets or objects in the downsampled depth image may be determined such that the background may be removed or discarded to isolate foreground objects such as a human target associated with a user, which will be described in more detail below. In one embodiment, as described above, the target recognition, analysis, and tracking system may downsample a captured or observed depth image by generating a grid of one or more voxels for the captured or observed depth image. The target recognition, analysis, and tracking system may analyze each of the voxels in the downsampled depth image to determine whether a voxel may be associated with a background object such as one or more non-human targets of the depth image. If a voxel may be associated with a background object, the voxel may be removed or discarded from the downsampled depth image such that a foreground object such as the human target and the one or more voxels in the grid associated with the foreground object may be isolated, which will be described in more detail below.

According to one embodiment, the target recognition, analysis, and tracking system may analyze each voxel to determine an object associated therewith. For example, as described above, a scene that may be observed or captured at 305 as the depth image 400 described above with respect to FIG. 6 may include a plurality of objects. The objects may include one or more human targets and/or one or more non-human targets such as a wall, a table, a couch, a lamp, or the like. In one embodiment, the target, recognition, analysis, and tracking system may analyze each voxel in the grid to determine which object in the scene the voxel may be as associated with such that the target recognition, analysis, and tracking system may identify voxels associated with each object in a scene at 315. Thus, according to an example embodiment, if a human target or person may be standing in front of a wall in a scene, the target recognition, analysis, and tracking system may analyze each voxel to determine whether the voxel may be associated with the human target or the wall.

To determine which object in the scene a voxel may be associated with, the target, recognition, analysis, and tracking system may compare values such as an average depth value of the valid or non-zero depth values for the pixels in the block or portion that the voxel may represent, a minimum and/or maximum depth value of the pixels in the portion or block that the voxel may represent, an average of the X values and Y values for pixels having a valid depth value that the voxel may represent, or any other suitable information of neighboring or nearby voxels. For example, in one embodiment, the minimum depth value associated with a particular voxel being analyzed in the grid may compared to the minimum depth values of each voxel that may be adjacent to the particular voxel being analyzed in the grid. If the difference between the minimum depth value of the particular voxel being analyzed and a minimum depth value of an adjacent voxel may be less than a threshold, the particular voxel and the adjacent voxel may be identified as belonging to the same object. If the difference between the minimum depth value of the particular voxel being analyzed and an minimum depth value of an adjacent voxel may be greater than the threshold, the particular voxel and the adjacent voxel may be identified as belonging to separate objects. According to an example embodiment, the threshold may be a predetermined value generated by, for example, the target recognition, analysis, and tracking system that may be based on a likelihood or probability that voxels may be part of the same object. Thus, according to an example embodiment, if a human target or person may be standing in front of a wall in a scene captured or observed by the depth image, the target recognition, analysis, and tracking system may analyze each voxel generated for the depth image to determine whether the voxel may be associated with the human target or the wall.

After identifying the objects and the voxels associated therewith in the scene of the received depth image, the target recognition, analysis, and tracking system may then calculate information associated with each identified object. For example, the target recognition, analysis, and tracking system may calculate a maximum world space for each identified object, a minimum world space position, and an average world space position, or the like.

In one embodiment, the target recognition, analysis, and tracking system may further determine whether one or more of the objects identified in a scene should be merged with other objects in the scene at 315. For example, part or a portion of an object may be separated from another part or portion of the object in the depth image received at 305. According to one embodiment, the part or portion of an object may be separated from another part or portion of the object by an infrared shadow that may be cast by, for example, the object, another object, or the like in the scene. In another example embodiment, the part or portion of an object may be separated from another part or portion of the object by, for example, colors, textures, patterns, or the like associated with the object. For example, a head of a human target may be separated from a torso of the human target along an Y-plane in the Y-direction by, for example, facial hair, various articles of clothing, or the like.

To determine whether an object identified in the scene may actually be a part or a portion of another object identified in the scene, the target recognition, analysis, and tracking system may compare the X-values, Y-values, and/or the depth values of the voxels associated with the object with X-values, Y-values, and/or depth values of the voxels associated with nearby objects. For example, the target recognition, analysis, and tracking system may compare an X-value, a Y-value and/or a depth value of one or more voxels associated with, for example, a first object identified in the scene with an X-value, a Y-value, and/or a depth value of one or more voxels associated with a second object that may be nearby or adjacent to the first object. Thus, according to an example embodiment, the target recognition, analysis, and tracking system may analyze the voxels in a scene to determine whether a first and second object may overlap along the X-plane defined in the X-direction, the Y-plane defined in the Y-direction, and/or the Z-plane defined in the Z-direction such that the first and second objects may be merged and identified as being parts or portions of the same object.

According to one embodiment, if the X-value, the Y-value, and/or the depth value of one or more voxels associated with the first object may overlap an X-value, a Y-value and/or a depth value of one or more voxels associated with the second object, the target recognition, analysis, and tracking system may merge the first and second objects such that the target recognition, analysis, and tracking system may identify the first and second objects as being parts or portions of a common object. For example, if a first voxel associated with a first object may have an X-value of 5 along the X-direction and a depth value of 10 mm at a right outer edge of the first object and a second voxel associated with a second object may have an X-value of 3 along the X-direction and a depth value of 10 mm at a left outer edge of the second object, the target recognition, analysis, and target system may determine that the first and second objects may overlap. The target, recognition, analysis, and tracking system may then merge the first and second objects such that the target, recognition, analysis, and tracking system may identify the first and second objects as being parts or portions of the same object.

Additionally, to determine whether an object identified in the scene may actually be a part or a portion of another object identified in the scene, the target recognition, analysis, and tracking system may determine whether a bounding box defined for an object overlaps a bounding box of another object in the scene. For example, the target recognition, analysis, and tracking system may define a bounding box for each identified object. The target recognition, analysis, and tracking system may then determine whether the bounding boxes of one or more objects overlap based on, for example, X-values, Y-values, and/or depth values of one or more voxels included therein as described above.

According to another example, embodiment, the target recognition, analysis, and tracking system may determine a center or centroid of each object by, for example, averaging the X-values, Y-values, and depth values of the voxels included in the object. The target recognition, analysis, and tracking system may then determine a distance between the centroid or center of objects in the scene to determine whether an object identified in the scene may actually be a part or a portion of another object identified in the scene. Based on the distance between objects, the target, recognition, analysis, and tracking system may merge one or more objects. For example, the target recognition, analysis, and tracking system may determine a distance between a centroid or center of a first object and a center or centroid of a second object. If the distance between the centroid or center of the first object and the second object may be within a predetermined range that indicates the first and second objects should be merged, the target recognition, analysis, and tracking system may merge the objects such that the target, recognition, analysis, and tracking system may identify the first and second objects as being parts or portions of the same object.

In one embodiment, the target recognition, analysis, and tracking system may further determine whether one or more of the objects identified in the scene should be separated at 315. For example, an object identified in the scene at 315 may actually be two separate objects. To determine whether an object in the scene should be separated, the target recognition, analysis, and tracking system may identify a location of a center of each object determined for a previously received frame. According to one embodiment, the target recognition, analysis, and tracking system may then simultaneously floodfill the voxels in the scene generated for the depth image of the frame received at 305 starting with the location of the center determined from the objects of the previously received frame. The target recognition, analysis, and tracking system may then determine which object in the previously received frame the floodfilled voxels may be closer to using the previous locations for the objects. The target recognition, analysis, and tracking system may split an object at 315 if the floodfilled voxels may be closer to another object identified in a previously received frame.

At 315, the target recognition, analysis, and tracking system may further determine whether the identified objects may be a background object such as non-human target or a foreground object such as a human target. According to an example embodiment, the target recognition, analysis, and tracking system may determine whether the identified objects may be a background object or a foreground object based on whether the identified objects may be in motion or moving. For example, the target recognition, analysis, and tracking system may include a reference plate such as a reference image of the scene that includes, for example, non-motion depth information for each voxel. According to one embodiment, the reference plate may include a moving average associated with each voxel in the scene. The moving average may include, for example, an average depth value of a voxel determined over a series of previously received frames.

In other example embodiments, the reference plate may also include a minimum world space position of the voxels such as the minimum X-values, Y-values, and depth values for the voxels in the grid determined over a series of previously received frames, a maximum world space position of the voxels such as the maximum X-values, Y-values, and depth values for the voxels in the grid determined over a series of previously received frames, an average world position of the voxels such as the average X-values, Y-values, and depth values for the voxels in the grid determined over a series of previously received frames, or any other suitable reference plate.

According to one embodiment, the target recognition, analysis, and tracking system may compare depth information such as a maximum depth value, an average depth value, a minimum depth value, or the like of each voxel associated with the identified objects in the scene of the depth image received at, for example, 305 with the non-motion depth information of each corresponding voxel included in the reference plate. Based on the comparison of the depth information and the non-motion depth information of the corresponding voxel in the reference plate, the target recognition, analysis, and tracking system may identify a voxel as moving. For example, in one embodiment, if a depth value such as the minimum depth value, the maximum depth value, and/or the average depth value of a voxel may be less than the moving average of the corresponding voxel in the reference plate such that the voxel may be in front of the moving average, the voxel may be identified as moving. According to another example embodiment, the target recognition, analysis, and tracking system may calculate a difference between the values associated with the voxel and the corresponding voxel in the reference plate. If, for example, a difference between a depth value such as the average depth value, the maximum depth value, and/or the minimum depth value of a voxel and depth values included in the non-motion information of the corresponding voxel in the reference plate may be greater than a motion threshold, the voxel may be identified by the target recognition, analysis, and tracking system as moving.

In another example embodiment, the target recognition, analysis, and tracking system may compare depth information such as a maximum depth value, an average depth value, a minimum depth value, or the like of a voxel and the voxels adjacent thereto with the non-motion depth information of each corresponding voxel included in the reference plate. For example, to handle edge noise, the target recognition, analysis, and tracking system may compare a minimum depth value of a particular voxel and the voxels that may be adjacent thereto against the corresponding voxel in the reference plate to determine whether a voxel and/or the object associated therewith may be moving. If, for example, a difference between the minimum depth value of the particular voxel and the voxels that may be adjacent thereto and the minimum depth value included in the non-motion information of the corresponding voxels in the reference plate may be greater than a motion threshold, the particular voxel may be identified by the target recognition, analysis, and tracking system as moving.

The target recognition, analysis, and tracking system may then calculate a foreground score for each identified object based on a percentage of moving voxels. In one embodiment, the target recognition, analysis, and tracking system may divide the number of voxels included in the island that may be identified as moving by the total number of voxels included in the island to calculate the foreground score.

At 320, the background may be removed or discarded. For example, as described above. the target recognition, analysis, and tracking system may remove or discard the background to isolate a foreground object such as a human target associated with a user. According to one embodiment, the target recognition, analysis, and tracking system may isolate the object having a foreground score that may exceed a score threshold. The score threshold may be a value or percentage defined by the target recognition, analysis, and tracking system that may indicate an object may be in motion. For example, the target recognition, analysis, and tracking system may remove or discard the background objects that may not be moving based on the foreground score from the downsampled depth image such that the foreground object such as the human target that may have a foreground score that may exceed the score threshold may be isolated in the downsampled depth image.

Additionally, at 320, the target recognition, analysis, and tracking system may remove or discard the background objects and the voxels associated therewith based on a depth history. For example, the target recognition, analysis, and tracking system may include a reference plate that may include a depth history of the background object including, for example, a minimum depth value and/or a maximum depth value for each voxel included in background objects captured over a series of frames. The target recognition, analysis, and tracking system may compare the values associated with a voxel such as X-values, Y-values, and depth values with the reference plate that may include the minimum depth values and/or the maximum depth value of the voxels associated with the background objects. Based on the comparison, the target recognition, analysis, and tracking system may determine whether a voxel may be background. For example, if the X-values, Y-values, or depth values of a voxel may be greater than, for example, a maximum depth value of a corresponding voxel in the reference plate, the target recognition, analysis, and tracking system may identify the voxel as being part of the background. The target, recognition, analysis, and tracking system may then remove or discard the voxel.

Thus, according to an example, the target recognition, analysis, and tracking system may determine whether a voxel may have a depth value close to or behind a depth value for a corresponding voxel in the reference plate that may include a depth history of the minimum or maximum values observed for background objects. If the voxel may have a depth value close to or behind a depth value for a corresponding voxel in the reference plate, the target recognition, analysis, and tracking system may identify the voxel as being part of the background. The target, recognition, analysis, and tracking system may then remove or discard the voxel.

According to an example embodiment, to remove or discard the objects that may not be moving and/or that may have a depth value close to or behind a depth value in a reference plate that may include a depth history, the target recognition, analysis, and tracking system may replace the X-values, the Y-values, and/or the depth values with a zero value or another suitable indicator or flag that may indicate the voxel may be invalid.

In one embodiment, after isolating the foreground object such as the human target, as described above, the target recognition, analysis, and tracking system may upsample the foreground object such that the foreground object may rendered in a higher resolution. For example, the target recognition, analysis, and tracking system may use the X-values, Y-values, and the depth values for the pixels that may be associated with the voxels of the foreground object to generate a higher resolution foreground object.

The isolated voxels associated with the foreground object such as the human target may be processed at 325. In one embodiment, the target recognition, analysis, and tracking system may process the voxels associated with the isolated foreground object such as the human target to determine a location or position of one or more extremities such as a head, a centroid or center, shoulders, hips, arms, elbows, hands, legs, knees, feet, or the like. The target recognition, analysis, and tracking system may also process the voxels to determine dimensions such as measurements including widths, lengths, or the like of the one or more extremities.

At 325, the target recognition, analysis, and tracking system may also process the voxels associated with the isolated foreground object such that a model of the foreground object such as the human target may be generated. According to an example embodiment, the model may be tracked based on the determined extremities and their dimensions, an avatar associated with the model may be rendered and/or changed in response to changes to the model being tracked, and/or one or more applications executing on a computer environment may be controlled.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A computer-readable storage device having stored thereon computer executable instructions for processing depth information of a scene, the computer executable instructions comprising instructions for:
receiving a depth image of the scene, wherein the depth image comprises one or more objects;
determining that at least one object of the one or more objects in the depth image is moving, wherein determining that the at least one object of the one or more objects in the depth image is moving comprises:
comparing a value associated with each voxel in the one or more objects with a corresponding value of a reference voxel included in a reference plate;
identifying each voxel in the one or more objects as moving when a difference between the value and the corresponding value exceeds a motion threshold;
calculating a foreground score based on a percentage of moving voxels associated with the at least one object; and
identifying the at least one object as moving when the foreground score exceeds a score threshold;
isolating the at least one object that is moving; and
processing the at least one isolated object.

2. The computer-readable storage device of claim 1, the computer executable instructions further comprising instructions for determining whether to merge an object in the one or more objects with a nearby object in the one or more objects.

3. The computer-readable storage device of claim 2, wherein determining whether to merge the object in the one or more objects with the nearby object in the one or more objects comprises: comparing X-values, Y-values, or depth values associated with voxels in the object with X-values, Y-values, or depth values associated with voxels of the nearby object; and merging the object with the nearby object if, based on the comparison, the X-values, Y-values, or the depth values associated with the voxels in the object overlap the X-values, Y-values, or depth values associated with the voxels of the nearby object.

4. The computer-readable storage device of claim 1, the computer executable instructions further comprising instructions for determining that at least one object of the one or more objects is non-moving.

5. The computer-readable storage device of claim 4, the computer executable instructions further comprising instructions for discarding the at least one non-moving object of the one or more objects.

6. A system for processing depth information of a scene, the system comprising:
a capture device, wherein the capture device comprises a camera configured to capture a depth image of the scene; and
a computing device communicatively coupled to the capture device, wherein the computing device comprises a processor and memory storing thereon computer-readable instructions that, when executed by the processor, cause the computing device to perform operations comprising:
generating a downsampled depth image comprising one or more objects based on one or more pixels in the depth image received from the capture device;
determining that at least one object of the one or more objects in the downsampled depth image is moving, wherein determining that the at least one object of the one or more objects in the downsampled depth image is moving comprises:
comparing a value associated with each voxel in the one or more objects with a corresponding value of a reference voxel included in a reference plate;
identifying each voxel in the one or more objects as moving when a difference between the value and the corresponding value exceeds a motion threshold;
calculating a foreground score based on a percentage of moving voxels associated with the at least one object; and
identifying the at least one object as moving when the foreground score exceeds a score threshold;
isolating the at least one object that is moving; and
processing the at least one isolated object.

7. The system of claim 6, further comprising computer-readable instructions that, when executed by the processor, cause the computing device to perform operations comprising determining whether to merge an object in the one or more objects with a nearby object in the one or more objects.

8. The system of claim 7, further comprising computer-readable instructions that, when executed by the processor, cause the computing device to perform operations comprising:
determining whether merge an object in the one or more objects with a nearby object in the one or more objects:
comparing X-values or depth values associated with voxels in one of the object with X-values or depth values associated with voxels of a nearby object; and
merging the object with the nearby object if, based on the comparison, the X-values or the depth values associated with the voxels in the object overlap the X-values or depth values associated with the voxels of the nearby object.

9. The system of claim 6, further comprising computer-readable instructions that, when executed by the processor, cause the computing device to perform operations comprising discarding at least one non-moving object of the one or more objects.

10. A method for processing depth information of a scene, the method comprising:
receiving a depth image of the scene, wherein the depth image comprises one or more objects;
determining that at least one object of the one or more objects in the depth image is moving; wherein determining that the at least one object of the one or more objects in the depth image is moving comprises:
comparing a value associated with each voxel in the one or more objects with a corresponding value of a reference voxel included in a reference plate;
identifying each voxel in the one or more objects as moving when a difference between the value and the corresponding value exceeds a motion threshold;
calculating a foreground score based on a percentage of moving voxels associated with the at least one object; and
identifying the at least one object as moving when the foreground score exceeds a score threshold;
isolating the at least one object that is moving; and
processing the at least one isolated object.

11. The method of claim 10, further comprising determining whether to merge an object in the one or more objects with a nearby object in the one or more objects.

12. The method of claim 11, wherein determining whether to merge the object in the one or more objects with the nearby object in the one or more objects comprises: comparing X-values, Y-values, or depth values associated with voxels in the object with X-values, Y-values, or depth values associated with voxels of the nearby object; and merging the object with the nearby object if, based on the comparison, the X-values, Y-values, or the depth values associated with the voxels in the object overlap the X-values, Y-values, or depth values associated with the voxels of the nearby object.

13. The method of claim 10, further comprising determining that at least one object of the one or more objects is non-moving.

14. The method of claim 13, further comprising discarding at least one non-moving object of the one or more objects.

* * * * *